United States Patent [19]

Irie et al.

[11] Patent Number: 4,977,603
[45] Date of Patent: Dec. 11, 1990

[54] METHOD AND APPARATUS FOR A PATTERN RECOGNITION

[75] Inventors: Bunpei Irie, Suita; Haruo Asada, Yokohama, both of Japan

[73] Assignee: Kabushiki Kaisha Toshiba bisha, Kawasaki, Japan

[21] Appl. No.: 294,649

[22] Filed: Jan. 9, 1989

[30] Foreign Application Priority Data

Jan. 8, 1988 [JP] Japan .................................. 63-7930

[51] Int. Cl.$^5$ ............................................. G06K 9/68
[52] U.S. Cl. ...................................... 382/34; 382/50; 382/36; 382/25; 382/18; 358/462
[58] Field of Search ...................... 382/34, 18, 22, 27, 382/21, 26, 28; 358/462

[56] References Cited

U.S. PATENT DOCUMENTS

| | | | |
|---|---|---|---|
| 3,541,511 | 11/1970 | Genchi et al. | 382/25 |
| 3,688,267 | 8/1972 | Iijima et al. | 340/146.3 R |
| 3,688,267 | 8/1972 | Iijima et al. | 340/146.3 Q |
| 3,906,446 | 9/1975 | Iijima et al. | 382/36 |
| 4,479,236 | 10/1984 | Sakoe | 382/34 |
| 4,503,557 | 3/1985 | Maeda | 382/34 |
| 4,521,773 | 6/1985 | Lyon | 382/50 |
| 4,543,660 | 9/1985 | Maeda | 382/34 |
| 4,646,252 | 2/1987 | Terashita | 382/34 |
| 4,837,846 | 6/1989 | Oyabu et al. | 382/50 |

*Primary Examiner*—Michael Razavi
*Attorney, Agent, or Firm*—Schwartz, Jeffery, Schwaaab, Mack, Blumenthal & Evans Foley, Lardner

[57] ABSTRACT

A method and an apparatus for pattern recognition utilizing the multiple similarity method, capable of taking structural features of a pattern to be recognized into account, so that sufficiently accurate pattern recognition can be achieved even when the pattern may involve complicated and diverse variations. The method includes the steps of: counting a number of occurences within each one of localized regions which subdivides a pattern to be recognized, of local patterns indicating possible arrangements of picture elements; deriving a vector quantity indicating distribution of black picture elements which constitute the pattern, from the numbers of occurrences of the local patterns; calculating multiple similarity defined in terms of square of inner product of the vector quantity and one of prescribed standard vectors representing standard patterns; and recognizing the pattern by identifying the pattern with one of the standard pattern whose corresponding standard vectors gives the maximum values for the multiple similarity.

6 Claims, 5 Drawing Sheets

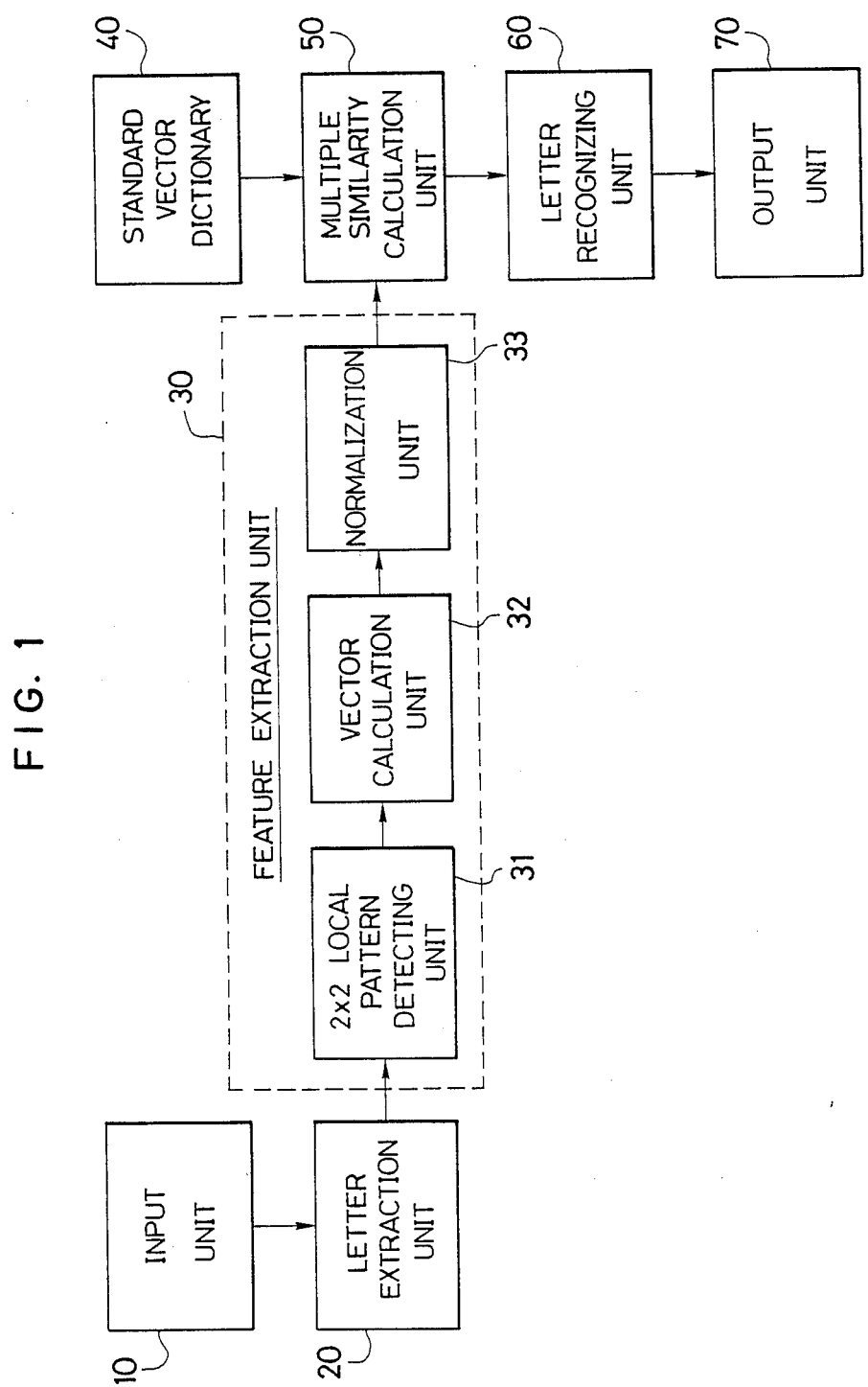
F I G. 1

FIG. 4

| | | | | | | | | |
|---|---|---|---|---|---|---|---|---|
| $P_1$ | ○ ○<br>○ ○ | 15<br>44<br>42 | 12<br>11<br>28 | 8<br>43<br>49 | $P_9$ | ● ○<br>○ ○ | 1<br>0<br>1 | 1<br>1<br>4 | 3<br>2<br>0 |
| $P_2$ | ○ ○<br>○ ● | 2<br>1<br>1 | 2<br>0<br>1 | 1<br>0<br>0 | $P_{10}$ | ● ○<br>○ ● | 0<br>0<br>0 | 0<br>0<br>0 | 0<br>0<br>0 |
| $P_3$ | ○ ●<br>○ ○ | 3<br>2<br>1 | 0<br>2<br>0 | 0<br>0<br>0 | $P_{11}$ | ● ●<br>○ ○ | 3<br>0<br>0 | 5<br>0<br>0 | 0<br>2<br>0 |
| $P_4$ | ○ ●<br>○ ● | 1<br>0<br>2 | 1<br>5<br>1 | 0<br>0<br>0 | $P_{12}$ | ● ●<br>○ ● | 2<br>1<br>0 | 1<br>2<br>0 | 0<br>0<br>0 |
| $P_5$ | ○ ○<br>● ○ | 1<br>0<br>0 | 1<br>3<br>0 | 2<br>0<br>0 | $P_{13}$ | ● ○<br>● ○ | 0<br>0<br>0 | 0<br>4<br>2 | 2<br>0<br>0 |
| $P_6$ | ○ ○<br>● ● | 4<br>0<br>0 | 7<br>0<br>0 | 4<br>0<br>0 | $P_{14}$ | ● ○<br>● ● | 1<br>0<br>0 | 0<br>3<br>0 | 1<br>0<br>0 |
| $P_7$ | ○ ●<br>● ○ | 0<br>0<br>1 | 0<br>0<br>0 | 0<br>0<br>0 | $P_{15}$ | ● ●<br>● ○ | 1<br>0<br>0 | 1<br>1<br>3 | 3<br>1<br>0 |
| $P_8$ | ○ ●<br>● ● | 1<br>1<br>0 | 2<br>0<br>2 | 1<br>0<br>0 | $P_{16}$ | ● ●<br>● ● | 13<br>0<br>0 | 15<br>16<br>7 | 24<br>1<br>0 |

METHOD AND APPARATUS FOR A PATTERN RECOGNITION

BACKGROUND OF THE INVENTION

1. Field of the Invention

The present invention relates to a method and an apparatus for pattern recognition capable of recognizing a given pattern by means of evaluating a quantity called a multiple similarity.

2. Description of the Background Art

A method for pattern recognition called the multiple similarity method has been known, the detail of which is disclosed by Iijima et al. in U.S. Pat. No. 3,688,267 and by Maeda in U.S. Pat. No. 4,503,557. In this multiple similarity method, a quantity called a multiple similarity defined as:

$$S = \sum_{i=1}^{n} k_i (V, R_i)^2 \quad (1)$$

$$i = 1 \text{ to } n$$

where i is an integer, $\vec{R}_i$ are n-orthogonal vectors determined from the standard patterns, $\vec{V}$ is a density pattern vector for an input pattern indicating a distribution of segments that constitute the input pattern, $k_i$ are coefficients, and (,) designates an inner product, is evaluated so that inessential difference between the input pattern and the standard pattern such as positional displacement can be ignored. As a result, it is possible in the multiple similarity method to achieve a highly accurate pattern recognition.

However, when a pattern to be recognized may involve complicated and diverse variations such as in a case of a hand written letter, it has not been possible to achieve a sufficient recognition accuracy even with the multiple similarity method. This is due to the fact that in the multiple similarity method the ability of recognition relies on density patterns of the input pattern, and not on a structural feature of the input pattern.

The density pattern in the multiple similarity method indicates the distribution of segments that constitute the input pattern, which is obtained by detecting a number of black picture elements that make up segments of the pattern, as oppose to the white picture elements that make up the background, within each one of regions which subdivide the input pattern, and by constructing a density pattern vector which indicates these number of black picture elements in different regions. Thus, for example, a pattern "#" may not be distinguished from a pattern "+" written in bold, as a number of black picture elements in a boldly written single line and that in double lines may not differ substantially.

It has therefore not been possible in a conventional pattern recognition method to achieve a satisfactory recognition accuracy when a pattern to be recognized may involve complicated and diverse variations such as in a case of a hand written letter, as structural features of a pattern to be recognized are not taken into account.

SUMMARY OF THE INVENTION

It is therefore an object of the present invention to provide a method and an apparatus for pattern recognition utilizing the multiple similarity method, capable of taking structural features of a pattern to be recognized into account, so that sufficiently accurate pattern recognition can be achieved even when the pattern may involve complicated and diverse variations such as in a case of a hand written letter, and thereby enhancing the scope of recognizable pattern significantly.

According to one aspect of the present invention there is provided a method of pattern recognition, comprising the steps of: (a) counting a number of occurrences within each one of localized regions which subdivides a pattern to be recognized, of local patterns indicating possible arrangements of picture elements; (b) deriving a vector quantity indicating distribution of black picture elements which constitute the pattern, from the numbers of occurrences of the local patterns counted at the step (a); (c) calculating multiple similarity defined in terms of square of inner product of the vector quantity and one of prescribed standard vectors representing standard patterns; and (d) recognizing the pattern by identifying the pattern with one of the standard pattern whose corresponding standard vectors gives the maximum values for the multiple similarity.

According to another aspect of the present invention there is provided an apparatus for pattern recognition, comprising: means for counting a number of occurrences within each one of localized regions which subdivides a pattern to be recognized, of local patterns indicating possible arrangements of picture elements; means for deriving a vector quantity indicating distribution of black picture elements which constitute the pattern, from the numbers of occurrences of the local patterns counted by the counting means; means for calculating multiple similarity defined in terms of square of inner product of the vector quantity and one of prescribed standard vectors representing standard patterns; and means for recognizing the pattern by identifying the pattern with one of the standard pattern whose corresponding standard vectors gives the maximum values for the multiple similarity.

Other features and advantages of the present invention will become apparent from the following description taken in conjunction with the accompanying drawings.

BRIEF DESCRIPTION OF THE DRAWINGS

FIG. 1 is a schematic block diagram of one embodiment of an apparatus for pattern recognition according to the present invention.

FIG. 4 is a tabulated illustration of 2×2 local patterns to be utilized in the apparatus shown in FIG. 1.

FIG. 5 is a diagrammatic illustration of feature data obtained for the pattern shown in FIG. 3, to be utilized in the apparatus shown in FIG. 1.

FIG. 6 is a diagrammatic illustration of a density pattern vector obtained for the pattern shown in FIG. 3, to be utilized in the apparatus shown in FIG. 1.

DETAILED DESCRIPTION OF THE PREFERRED EMBODIMENTS

Figure 2:
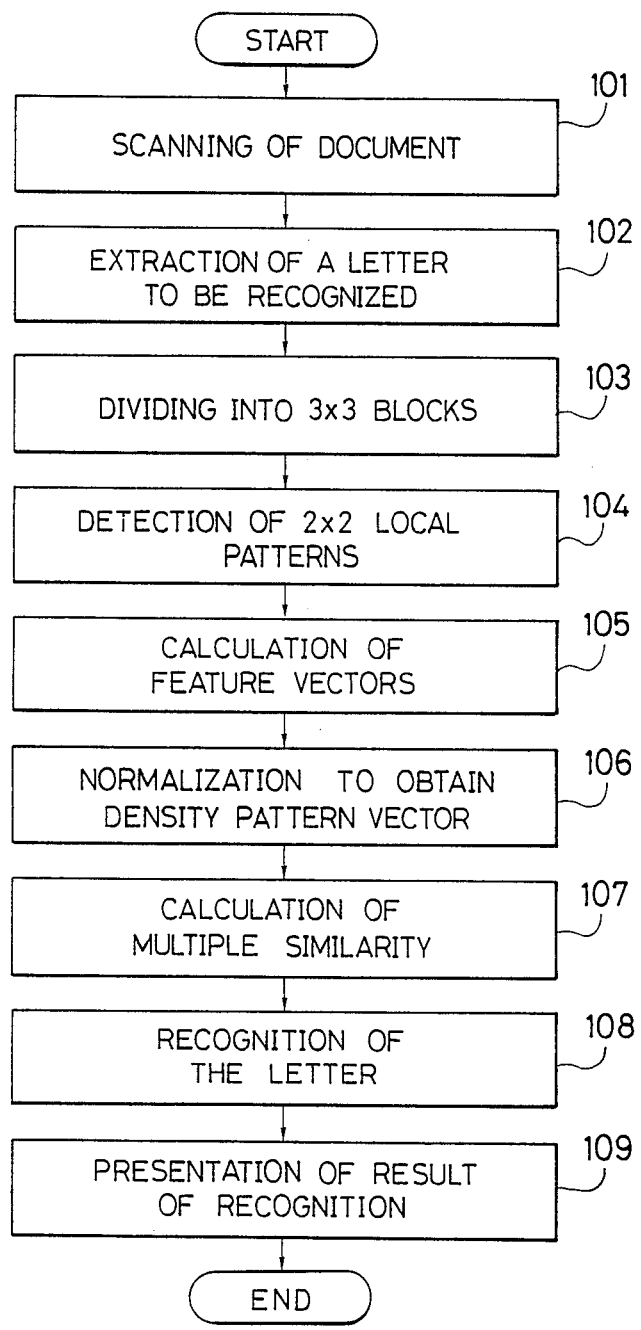
FIG. 2 is a flow chart for the operation of the apparatus shown in FIG. 1.

Referring now to FIG. 1, there is shown one embodiment of an apparatus for pattern recognition according to the present invention.

This apparatus comprises an input unit 10 including an imaging device which scans a document including a letter to be recognized and produces binary image data representing the scanned document, a letter extraction unit 20 for extracting a portion of the binary image data corresponding to the letter, a feature extraction unit 30 including a 2×2 local pattern detecting unit 31, a vector calculation unit 32, and a normalization unit 33, which determines numbers of occurrence of each 2×2 local patterns to be explained in detail below in the letter, and calculates a density pattern vector to be explained in detail below, a standard vector dictionary 40 for storing standard vectors, a multiple similarity calculation unit 50 for calculating a multiple similarity of the letter in accordance with the density pattern vector obtained at the feature extraction unit 30 and the standard vectors stored in the standard vector dictionary 40, a letter recognizing unit 60 for recognizing the letter by utilizing the calculated multiple similarity, and an output unit 70 for presenting the result of the recognition.

Referring now to FIG. 2, the operation of this apparatus will be explained, using an example of a particular letter to be recognized, with subsidiary references to FIGS. 3 to 6.

Figure 3:
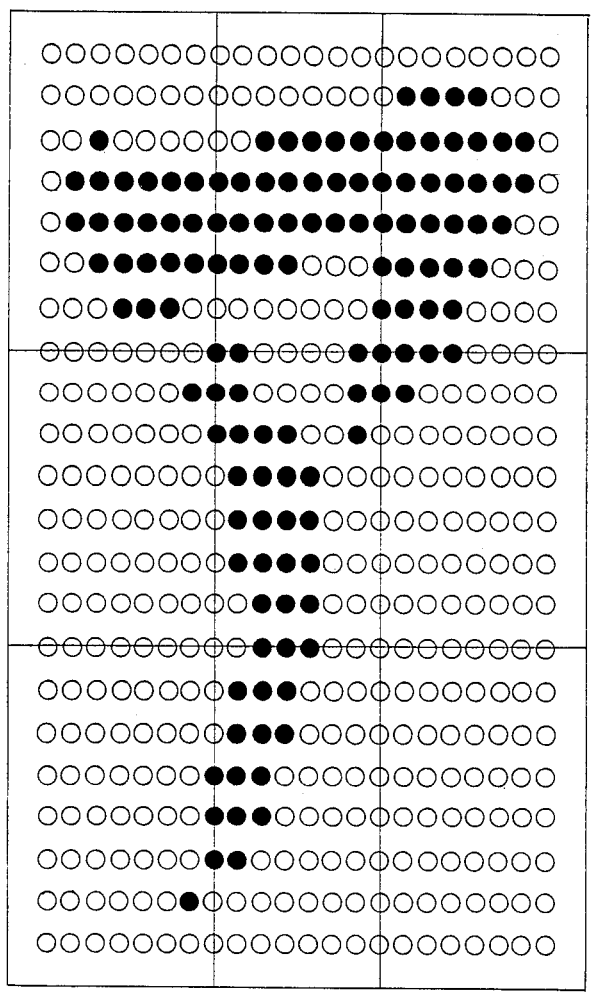
FIG. 3 is an illustration of an example of a pattern to be recognized used in an explanation of operation of the apparatus shown in FIG. 1.

So, as an example of the letter to be recognized, consider a Japanese character "ー" (pronounced as 'ah') shown in FIG. 3.

At the step 101, a document containing this letter is scanned by the input unit 10 to produce the binary image data, and at the step 102, a part of the binary image data corresponding to this letter is extracted by the letter extraction unit 20, which is subsequently transmitted to the 2×2 local pattern detecting unit 31 in the feature extraction unit 30.

Next, at the step 103, the 2×2 local pattern detecting unit 31 divides a rectangle enclosing the entire letter into 9 blocks arranged in 3×3 matrix form, as indicated in FIG. 3 by the solid lines, and at the step 104, numbers of occurrence of each one of the 2×2 local patterns shown in FIG. 4 in each one of these blocks are counted.

In FIG. 4, each box dedicated to each 2×2 local pattern contains a label for that 2×2 local pattern of the form $P_i$ (i=1 to 16), an illustration of 2×2 picture element matrix which defines the pattern, and a 3×3 matrix array of numbers each of which indicates the number of occurrence of the pattern in the corresponding block of the 9 blocks that divide the letter "ー". Thus, for example, the pattern $P_1$ is the one consisting of four white picture elements in 2×2 matrix form, and this pattern occurs 15 times in the upper left block, 44 times in the middle left block, 42 times in the lower left block, and so on. It is to be noted that this counting of the number of occurrence of different 2×2 local patterns enable the comprehension of the structural feature of the letter. For example, from the fact that the pattern $P_4$ occurs most frequently in the central block, the structural feature of the letter that there is a greatest amount of the vertical edges in the central portion of the letter can be discerned. Note also that these 3×3 matrix arrays of numbers can be considered as effectively defining 9-dimensional vectors with each number as a component, which will be referred as recurrence vectors and represented by the label of the corresponding pattern i.e. $\vec{P}_1$ to $\vec{P}_{16}$, in the following.

Next, at the step 105, the vector calculation unit 32 calculates the 9-dimensional vectors $\vec{W}_1$ to $\vec{W}_4$ shown in FIG. 5, from the 16 recurrence vector of the 2×2 local patterns $\vec{P}_1$ to $\vec{P}_{16}$, which will be referred as feature vectors in the following.

In this embodiment, the feature vector $\vec{W}_1$ is calculated as a vector sum of the recurrence vectors $\vec{P}_6$ and $\vec{P}_{11}$ weighted by one, and other recurrence vectors weighted by zero. In other words, the feature vector $\vec{W}_1$ is given by:

$$\vec{W}_1 = \vec{P}_6 + \vec{P}_{11} \tag{2}$$

Similarly, the feature vector $\vec{W}_2$ is calculated as a vector sum of the recurrence vectors $\vec{P}_2$ and $\vec{P}_9$ weighted by one, and other recurrence vectors weighted by zero. In other words, the feature vector $\vec{W}_2$ is given by:

$$\vec{W}_2 = \vec{P}_2 + \vec{P}_9 \tag{3}$$

and, the feature vector $\vec{W}_3$ is calculated as a vector sum of the recurrence vectors $\vec{P}_4$ and $\vec{P}_{13}$ weighted by one, and vectors weighted by zero. In other words, the feature other recurrence vector $\vec{W}_3$ is given by:

$$\vec{W}_3 = \vec{P}_4 + \vec{P}_{13} \tag{4}$$

and, the feature vector $\vec{W}_4$ is calculated as a vector sum of the recurrence vectors $\vec{P}_3$ and $\vec{P}_5$ weighted by one, and other recurrence vectors weighted by zero. In other words, the feature vector $\vec{W}_4$ is given by:

$$\vec{W}_4 = \vec{P}_3 + \vec{P}_5 \tag{5}$$

As a result, the feature vectors $\vec{W}_1$, $\vec{W}_2$, $\vec{W}_3$, and $\vec{W}_4$ indicate the number of occurrence of the black picture elements in transverse, diagonal from upper right to lower left, longitudinal, and diagonal from upper left to lower right directions, respectively.

Figures 5, 6:
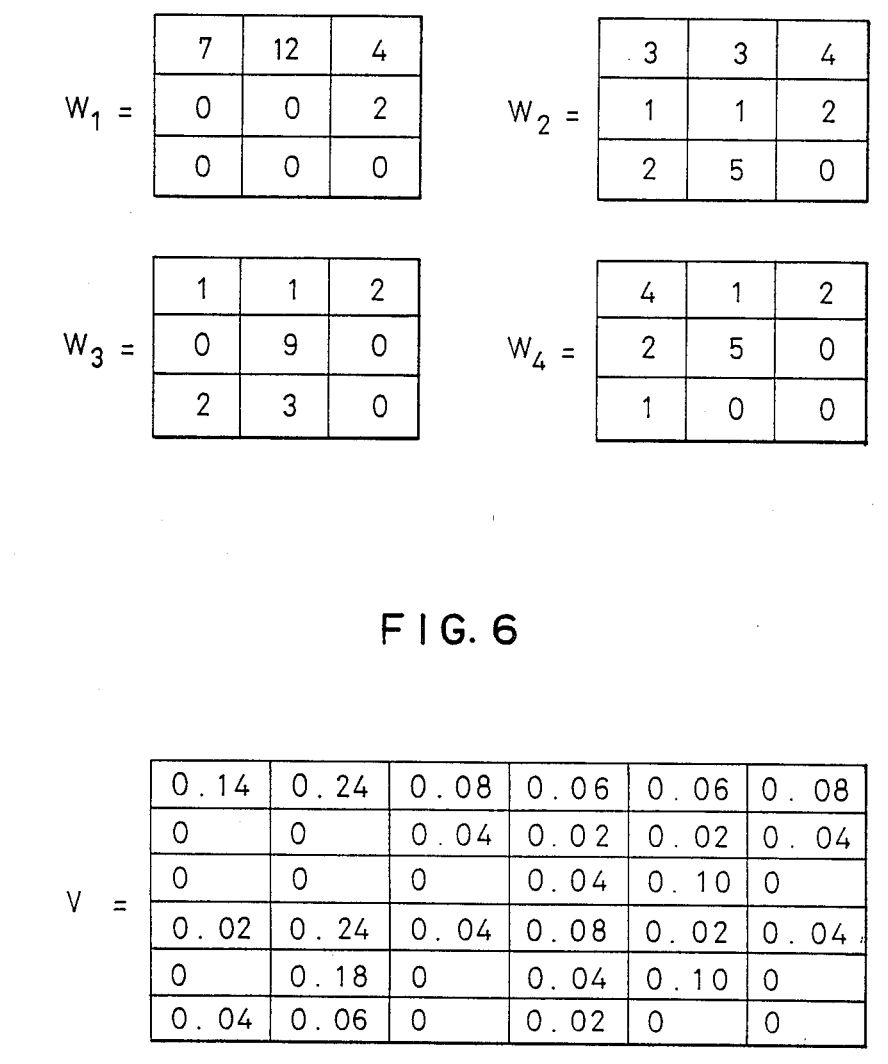

Then, at the step 106, the normalization unit 33 normalizes each feature vector by the total number of the picture elements in each block, 7×7=49, and combines them together to form a 36-dimensional density pattern vector $\vec{V}$ shown in FIG. 6. In other words, in the density pattern vector of FIG. 6, 9 elements of 3×3 form in the upper left is the feature vector $\vec{W}_1$ with each element divided by 49, 9 elements of 3×3 form in the upper right is the feature vector $\vec{W}_2$ with each element divided by 49, and so on.

Next, at the step 107, the multiple similarity calculation unit 50 calculates the multiple similarity S according to the aforementioned expression:

$$S = \sum_{i=1}^{n} k_i (V, R_i)^2 \qquad (1)$$
$$i = 1 \text{ to } n$$

where is is an integer, $\vec{R}_i$ are n-orthogonal standard vectors stored in the standard vector dictionary 40, $k_i$ are coefficients, and (,) designates an inner product. The detail explanation of the standard vectors can be found in the references cited above, so that it is not reproduced here. It suffices here to note that a set of the standard vectors $\vec{R}_i$ is prescribed for each of different type of letters represented by the standard letters, with one of which the input letter is to be identified. This calculation of the multiple similarity is carried out for each set of the standard vectors $\vec{R}_i$ and the obtained multiple similarities are subsequently transmitted to the letter recognizing unit 60.

Now, because of the definition of the multiple similarity given above, when there is a little resemblance between the input letter and a particular standard letter, the multiple similarity S calculated with a set of standard vectors corresponding to this standard letter takes a small value near zero, whereas when there is a great resemblance between the input letter and a particular standard letter, the multiple similarity S calculated with a set of standard vectors corresponding to this standard letter takes a large value near one.

This fact is utilized in recognizing the input letter at the step 108 in which the multiple similarity S with the maximum value is detected, and the input letter is identified with the standard letter corresponding to the set of the standard vectors which produced the maximum multiple similarity value. Finally the result of this identification is presented by the output unit 70 at the step 109.

As explained, according to this embodiment, it is possible to take structural features of a pattern to be recognized into account as the feature vectors obtained from the $2\times 2$ local patterns which contain information concerning the structural feature, so that sufficiently accurate pattern recognition can be achieved even when the pattern may involve complicated and diverse variations such as in a case of a hand written letter, and hence the scope of recognizable pattern is enhanced significantly.

It is to be noted that the specific numbers used in the above explanation such as the dimensions of various vector quantities, the number of blocks, and the value of weight factors can be modified in various different manners without departing from the novel feature of the present invention. In particular, by replacing the recurrence vectors in the above embodiment by the recurrence vectors multiplied by the total number of the black picture elements constituting the pattern, the area of the black picture element can be taken into account so that the influence of the noises can be reduced. Similarly, the shape of the block may be modified, the adjacent blocks may be made to overlap, or the weight factors may be made location-dependent. Furthermore, the detection of the $2\times 2$ local patterns may be performed in the circumferential regions alone. Moreover, the expression of the multiple similarity may be modified so long as the square of the inner product of the feature vector and the standard vector is utilized.

Besides these, many modifications and variations of this embodiment may be made without departing from the novel and advantageous features of the present invention. Accordingly, all such modifications and variations are intended to be included within the scope of the appended claims.

What is claimed is:

1. An apparatus for pattern recognition of a pattern constituted by an arrangement of black picture elements on a background constituted by white picture elements comprising:
    means for counting a number of occurrences within each one of localized regions of local patterns indicating possible arrangements of the white and black picture elements, the localized regions subdividing the pattern:
    means for deriving a vector quantity indicating distribution of black picture elements on a basis of the numbers of occurrences of the local patterns for each one of the localized regions counted by the counting means;
    means for calculating multiple similarity defined in terms of the square of the inner product of the vector quantity derived by the deriving means and each one of prescribed standard vectors representing one of prescribed standard patterns;
    means for recognizing the pattern by identifying the pattern with one of the standard patterns for which the multiple similarity calculated by the calculating means is maximum.

2. The apparatus of claim 1, wherein the local patterns are in forms of $2\times 2$ matrices.

3. The apparatus of claim 1, wherein the vector quantity contains information concerning densities of black picture elements evaluated across the pattern along more than one direction.

4. A method of pattern recognition of a pattern constituted by an arrangement of black picture elements on a background constituted by white picture elements, comprising the steps of:
    (a) counting the number of occurrences within each one of localized regions of local patterns indicating possible arrangements of the white and black picture elements the localized regions subdividing the pattern;
    (b) deriving a vector quantity indicating distribution of the black picture elements on a basis of the number of occurrences of the local patterns for each one of the localized regions counted at the step (a);
    (c) calculating multiple similarity defined in terms of the square the inner product of the vector quantity derived at step (b) and each one of prescribed standard vectors representing one of prescribed standard patterns; and
    (d) recognizing the pattern by identifying the pattern with one of the standard patterns for which the multiple similarity calculated by the calculating means is maximum.

5. The method of claim 4, wherein the local patterns are in forms of $2\times 2$ matrices.

6. The method of claim 4, wherein the vector quantity contains information concerning densities of the black picture elements evaluated across the pattern along more than one direction.

* * * * *